Dec. 16, 1941. E. W. SEEGER ET AL Re. 21,980
CIRCUIT CONTROLLING SYSTEM
Original Filed Sept. 4, 1937
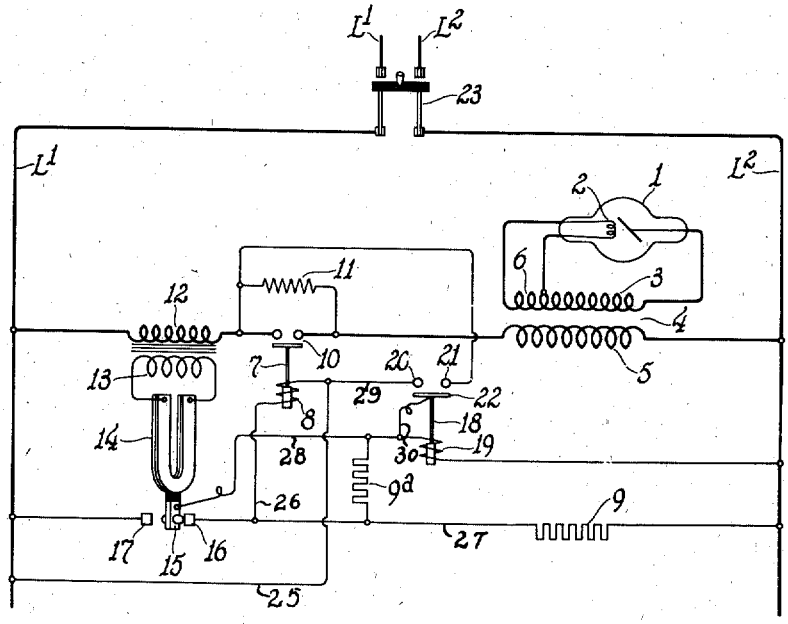
Inventors
Edwin W. Seeger
Blendon C. Brown
By Paul Hubbard
Attorney Reissued Dec. 16, 1941 Re. 21,980

UNITED STATES PATENT OFFICE 21,980

CIRCUIT CONTROLLING SYSTEM

Edwin W. Seeger, Wauwatosa, and Glendon C. Brown, deceased, late of Wauwatosa, Wis., by Cutler-Hammer, Inc., Milwaukee, Wis., assignee Original No. 2,164,087, dated June 27, 1939, Serial No. 162,544, September 4, 1937. Application for reissue May 22, 1941, Serial No. 394,738

12 Claims. (Cl. 250—93)

The present invention relates to circuit controlling systems, and more particularly to systems requiring provision for time elements.

Where electronic apparatus such as an X-ray tube having a heated cathode is to be energized to conduct current for a given period it is important that the heater cathode be at a substantially normal temperature before the main discharge circuit is energized in order to avoid injury to the cathode. Also it is often necessary to time the period of energization of the X-ray tube very accurately to prevent over-exposure with resulting damage to the exposed object, and it is desirable that after an exposure period the circuit be rendered inactive pending manual operation of a pilot switch.

An object of the present invention is to provide a simple and effective system affording the desired control of such X-ray tubes and other devices.

Another object is to provide a system affording graduation of the power supplied to the X-ray tube or other translating device, and to afford a time limit to supply of power at one value and also time limit to supply of power at another value.

Another object is to provide a system which affords such time limit with accuracy and which if desired may be designed to insure against repeated cycles of operation except upon manual operation of a pilot switch.

Other objects and advantages will hereinafter appear.

The accompanying drawing illustrates diagrammatically one embodiment of the invention which will now be described, it being understood that the embodiment illustrated is susceptible of modification without departing from the scope of the appended claims.

Referring to the drawing, there is shown an X-ray tube 1 to be supplied with energy from lines $L^1$ and $L^2$ supplied with alternating current. The tube 1 which has a heated cathode 2 has its main electrodes connected across secondary winding 3 of a transformer 4 which has a primary winding 5 and another secondary winding 6. The secondary winding 6 is connected to the terminals of the cathode 2 and supplies the heating energy for said cathode.

A relay 7 has an energizing winding 8 connected in series with a resistance 9 across the line $L^1$—$L^2$. This relay has normally disengaged contacts 10 preferably paralleled by high impedance or indicating lamp 11. The contacts 10 control a circuit for the primary winding of transformer 4 which circuit includes an impedance 12 with which is associated a secondary winding 13. The winding 13 is connected to a bimetallic strip 14 and said winding when energized supplies to said strip heating current. The bimetallic strip 14 has associated therewith contacts 15, 16 and 17 and constitutes a timing switch. The contact 15 normally engages contact 16 and disengages said contact 16 when the strip is heated. Further movement of contact 15 effects its engagement with the normally disengaged contact 17. The contact 17 is connected to line $L^1$ while contact 16 is connected to a point between the winding 8 of relay 7 and resistance 9, said contact 16 being also connected to contact 15 through a resistance $9^a$.

A relay 18 having a winding 19 is provided with stationary contacts 20 and 21 and a movable bridging contact 22, the latter normally disengaging said stationary contacts. The winding 19 of the relay is connected between contact 15 of the timing switch and line $L^2$. The contact 22 of relay 18 is connected to a point between contact 15 and the terminal of winding 19 which is connected to contact 15. Contact 20 is connected to line $L^1$ and contact 21 is connected to a point between impedance 12 and the contacts 10 of relay 7.

The primary winding 5 of transformer 4 has one terminal connected through contacts 10 of relay 7 to and through impedance 12 to line $L^1$ while the other terminal of winding 5 is connected to line $L^2$, lines $L^1$ and $L^2$ being connected to a suitable source through a manual pilot switch 23.

With the switch 23 closed and the time switch in normal position current flows from line $L^1$ by conductor 25 through the winding 8 of relay 7 by conductors 26 and 27 through resistance 9 to line $L^2$. The relay 7 is thus energized and engages its contacts 10 to complete a circuit from line $L^1$ through impedance 12 to and through the primary winding 5 of transformer 4 to line $L^2$. The transformer 4 is thus energized at a reduced voltage so that the potential impressed on the tube 1 is not sufficient to produce discharge. However, the secondary winding 6 is excited to supply sufficient heating current to the cathode 2 to bring it to the proper temperature within a short period.

The winding 12 being now energized induces a current in winding 13 which heats up the bimetallic strip 14 and after lapse of a given time according to the design and adjustment of the time switch the contact 15 disengages contact 16 and engages contact 17. When the contact 15 engages contact 17 it closes a circuit from line $L^1$ over contacts 17—15, coil 19, to line $L^2$, thus energizing relay 18 which bridges contacts 20—21—22. A second circuit is thereby established from line $L^1$ over contacts 17—15, contacts 22—21, through impedance 12 to line $L^1$ thus short-circuiting the impedance 12 whereby full line voltage is impressed on the transformer winding 5 to cause the tube 1 to discharge. Also relay 18 in responding establishes for itself a maintaining circuit independent of the timing switch. This maintaining circuit may be traced from line $L^1$ by conductors 25 and 29 to contact 20 and bridging contact 22 by conductor 30 to and through winding 19 to line $L^2$.

When the impedance 12 is short-circuited the bimetallic strip 14 is permitted to cool and after lapse of a given time the contact 15 disengages contact 17 and shortly thereafter reengages contact 16. Reengagement of contact 15 with contact 16 short-circuits the winding 8 of relay 7 causing said relay to release to insert impedance 11 in series with the transformer winding 5 for stopping discharge of the tube 1. The short-circuit for the winding 8 of relay 7 extends from line $L^1$ by conductors 25 and 29 through the contacts 20 and 22 of relay 8 by conductors 30 and 28 through contacts 15 and 16 of the timing switch to and through resistance 9 to line $L^2$.

When relay 7 releases relay 18 remains energized due to its self-established maintaining circuit and thus before the tube 1 may be caused to discharge again the pilot switch 23 must be opened to deenergize relay 18. When the relay 18 opens it interrupts the short-circuit of the winding 8 of relay 7 whereupon the system is prepared for a further cycle of operation upon reclosure of switch 23.

The impedance 11 is of a high value, its purpose being to prevent discharge of tube 1 and high voltage transient impulses in the transformer 4 if the contact 10 upon deenergization of relay 7 should vibrate and intermittently open and close the circuit.

The periods of operation may be adjusted in various ways, as for instance by relative adjustment of the contacts 15, 16 and 17 or by adjustment of the winding 13.

What we claim as new and desire to secure by Letters Patent is:

1. The combination with a translating device and a source of energy therefor, of an impedance, electroresponsive switches to establish energy supply connections for said translating device inclusive and exclusive of said impedance, and control means for said switches comprising a thermal switch associated with said impedance to be thermally influenced by the current traversing said impedance, said thermal means controlling the time at which said impedance is excluded and determining the duration of the periods in which said switches effect supply of energy to said translating device with said impedance included and with said impedance excluded.

2. The combination with a translating device and a source of energy therefor, of an impedance, electroresponsive switches to afford energy supply connections for said translating device and to include and exclude said impedance for graduation of the supply of said energy to said translating device, and control means for such switches comprising a manual pilot switch and timing means effective upon actuation of said pilot switch, said timing means determining the time of exclusion of said impedance and determining the periods during which said switches effect supply of energy to said translating device with said impedance included and with said impedance excluded, and said control means insuring against repetition of cycles except upon operation of said manual switch for each cycle.

3. The combination with a translating device and a source of energy therefor, of an impedance, electroresponsive switches to afford energy supply connections for said translating device and to include and exclude said impedance for graduation of the supply of energy to said translating device and control means for said switches comprising a manual pilot switch and a thermal switch associated with said impedance to be thermally influenced by the current traversing said impedance, said thermal switch determining the time of exclusion of said impedance and determining the periods during which said switches effect supply of energy to said translating device with said impedance included and with said impedance excluded, and said control means insuring against repetition of cycles except upon operation of said manual switch for each cycle.

4. The combination with a source of energy and a translating device to be supplied thereby, of an impedance, an electroresponsive switch to afford a connection for said translating device to said source through said impedance, a second electroresponsive switch to short circuit said impedance, and control means for said switches including a thermal switch associated with said impedance and thermally responsive to current in said impedance, said means in a given position of said thermal switch effecting response of said first mentioned switch and said thermal switch thereafter, but subject to a predetermined delay, effecting response of said second mentioned switch and after a further predetermined delay effecting deenergization of said first mentioned switch.

5. The combination with a source of energy and a translating device to be supplied thereby, of an impedance, an electroresponsive switch to afford a connection for said translating device to said source through said impedance, a second electroresponsive switch to short circuit said impedance, and control means for said switches including a thermal switch associated with said impedance and thermally responsive to current in said impedance, said means in a given position of said thermal switch effecting response of the first mentioned switch and said thermal switch thereafter, but subject to a predetermined delay, effecting response of said second switch and after a further predetermined delay effecting deenergization of said first mentioned switch, and said control means further including a manual switch requiring operation to deenergize said second mentioned switch preparatory to repetition of the cycle of control.

6. The combination with a translating device and a source of energy therefor, of an impedance, a thermal switch responsive to the current in said impedance and having contacts normally closing one circuit gap and normally opening another circuit gap, an electroresponsive switch to establish a supply connection between said source of energy and said translating device through said impedance and a second electroresponsive switch responsive to short-circuit said impedance and having its energizing winding connected in a circuit which includes the contacts of said thermal switch which normally open the circuit gap and connections completed by said second electroresponsive switch when energized and by the contacts of said thermal switch which normally close the circuit gap to short-circuit the first mentioned electroresponsive switch.

7. The combination with a translating device and a source of energy therefor, of an impedance, a thermally responsive switch responsive to the current in said impedance, said switch having a plurality of contacts certain of which are normally engaged and certain of which are normally disengaged, being engageable after disengagement of the first mentioned contact, an electroresponsive switch controllable at will to connect said translating device to said source of energy through said impedance, a second electroresponsive switch responsive to short-circuit said impedance, said second electroresponsive switch having an energizing circuit to be closed upon engagement of the normally disengaged contacts of said timing switch and having a maintaining circuit independent of said thermal switch, and a short-circuit for the operating winding of the first mentioned electroresponsive switch controlled jointly by the normally engaged contacts of said thermal switch and contacts of said second electroresponsive switch.

8. The combination with a translating device and a source of energy therfor, of a transformer having a primary winding and a secondary winding, a thermally responsive switch connected to said secondary winding to be thermally responsive to the current therein, said thermal switch having a movable contact element and cooperating contacts to be engaged thereby selectively, said element normally engaging one of said contacts, an electroresponsive switch responsive to establish a connection between said translating device and said source including said transformer primary winding, a second electroresponsive switch responsive to short-circuit said transformer primary winding and energizable by engagement of the normally disengaged contacts of said thermal switch and having a maintaining circuit independent of said thermal switch and a short-circuit for the energizing winding of the first mentioned electroresponsive switch controlled jointly by contacts of said second electroresponsive switch and the normally engaged contacts of said thermal switch.

9. The combination with a transformer and a source of energy therefor, a second transformer, an electroresponsive switch to complete a connection between the primary winding of the first mentioned transformer and said source, through the primary winding of the second transformer, a thermal switch supplied with heating current by the secondary winding of the second mentioned transformer, an electroresponsive switch controlled by said thermal switch to short-circuit the primary winding of the second mentioned transformer following response of the first mentioned switch but subject to a predetermined delay, and a short-circuit for the operating winding of said first mentioned switch controlled jointly by said second electroresponsive switch and said thermal switch for deenergizing the first mentioned switch following response of said second electroresponsive switch but subject to a predetermined delay.

10. The combination with a transformer and a source of energy therefor, a second transformer, an electroresponsive switch to complete a connection between the primary winding of the first mentioned transformer and said source through the primary winding of the second transformer, a thermal switch supplied with heating current by the secondary winding of the second mentioned transformer, an electroresponsive switch controlled by said thermal switch to short-circuit the primary winding of the second mentioned transformer following response of the first mentioned switch but subject to a predetermined delay and a short-circuit for the operating winding of said first mentioned switch controlled jointly by said second electroresponsive switch and said thermal switch for deenergizing the first mentioned switch following response of said second electroresponsive switch but subject to a predetermined delay, and a maintaining circuit for said second electroresponsive switch independent of said thermal switch.

11. The combination with a source of energy and a translating device to be supplied thereby, of control means to complete at will connections between said source of energy and said translating device inclusive of an impedance, then to exclude said impedance from circuit automatically, and then after a limited time to render said translating device ineffective pending subsequent manual operation of an element of said control means, said control means including electroresponsive switches and a double throw thermally responsive switch subject to thermal influence of current derived from said source one of said electroresponsive switches being responsive, following manual initiation of a cycle of operation, to exclude said impedance from the circuit of said translating device to render the latter active and the other of said electroresponsive switches being responsive subject to control by said thermally responsive switch to eliminate the aforementioned thermal influence and subsequently to coact with said thermally responsive switch to render said translating device ineffective and in so doing to deenergize said first mentioned electroresponsive switch, said second mentioned electroresponsive switch establishing for itself a maintaining circuit requiring for its interruption the aforementioned manual operation.

12. The combination with a source of energy and a translating device to be supplied thereby, of control means to complete at will connections between said source of energy and said translating device inclusive of an impedance, then to exclude said impedance from circuit automatically, and then after a limited time to render said translating device ineffective pending subsequent manual operation of an element of said control means, said control means including electroresponsive switches and a double throw thermally responsive switch subject to thermal influence of current derived from said source, one of said electroresponsive switches being responsive, following manual initiation of a cycle of operation, to exclude said impedance from the circuit of said translating device to render the latter active and the other of said electroresponsive switches being responsive subject to control by said thermally responsive switch to eliminate the aforementioned thermal influence, and subsequently to coact with said thermally responsive switch to deenergize said first mentioned electroresponsive switch and reinclude said impedance in circuit with said translating device, said second mentioned electroresponsive switch establishing for itself a maintaining circuit requiring for its interruption the aforementioned manual operation.

EDWIN W. SEEGER.
CUTLER-HAMMER, INC.,
*Assignee of Glendon C. Brown, Deceased,*
By GRAULEY S. CRANE,
*Vice President.*